UNITED STATES PATENT OFFICE.

WILHELM HASENBACH, OF MANNHEIM, GERMANY.

PURIFICATION OF HYDROCHLORIC-ACID GAS.

No. 834,977.   Specification of Letters Patent.   Patented Nov. 6, 1906.

Application filed December 2, 1905. Serial No. 289,973.

*To all whom it may concern:*

Be it known that I, WILHELM HASENBACH, a subject of the German Emperor, residing at Mannheim, Germany, have invented certain new and useful Improvements in the Purification of Hydrochloric-Acid Gas, of which the following is a specification.

In the manufacture of sulfates from sulfuric acid and rock-salt or from bisulfates and rock-salt it is difficult to purify the hydrochloric-acid gases coming from the sulfate-furnace. More particularly the separation of the arsenic from the gases presents considerable difficulties.

Our invention relates to improvements in the purification of the hydrochloric-acid gases, whereby this purification is exceedingly simplified and cheapened.

This invention is based on the discovery that vaporous chlorids of arsenic are absorbed by oils with a great energy. Now that the said hydrochloric-acid gases contain as impurities arsenic in the shape of chlorids, it is evident that they can be freed from their injurious arsenic by washing them with an oil. Also the other impurities of the commercial hydrochloric-acid gases—such as, for instance, sulfuric acid—are retained by the oil. Herein lies the principle of our invention.

For washing the hydrochloric-acid gases preferably oils are employed, which essentially consist of hydrocarbons. Among other things the distillates of the tar from brown coal have been found to be particularly suitable.

The method of purifying the hydrochloric-acid gases may be carried out, for example, in the following manner: The hydrochloric-acid gases leaving the sulfate-furnace and, if needful, freed from water are introduced into washing-towers, where an oil (for instance, an oil produced from brown-coal tar,) is trickled down. In these towers the gases deliver their impurities, particularly also the chlorids of arsenic, to the oil. If so required, the gases before their admission to the washing-towers may be first passed in a known manner through a filtering layer of porous bodies—for example, reduced charcoal—so that this filter may retain the greater part of the sulfuric acid and the ferric chlorid. The hydrochloric-acid gas leaving the washing-towers is freed from the impurities to such a degree that the latter (among them also the arsenic) cannot be any more traced or discovered even by the most exact methods, and that this purified gas is at once suitable for the manufacture of chlorin according to Deacon, or when absorbed by distilled water it will at once yield a chemically-pure hydrochloric acid.

It is obvious that instead of the washing-towers, in which an oil is trickled down, also other known apparatus may be used in which the gases and the oils may be mechanically brought into intimate contact with each other—for example, exhausters—through which the oil is passed and in which the gases meet a most finely-divided oil, or a combination of the washing-towers with an exhauster may be used.

The impurities delivered by the hydrochloric-acid gases to the oil and accumulated therein may be for the most part separated by washing the oil with water, whereupon the oil is ready for repeating its work. Should it be necessary to completely separate the impurities, particularly the arsenic, from the oil, this may be effected by washing the oil with water, to which a corresponding quantity of caustic lime is added, and afterward so much hydrochloric acid is added to this water as is required for dissolving the caustic lime. Fatty oils (glycerids) have also the property of absorbing chlorid of arsenic in the like manner as the oils mentioned above, but they offer difficulties in being afterward regenerated or purified by means of water.

Obviously the described method may be employed in all cases where vaporous chlorids of arsenic of the mentioned kind are to be separated from other gases or vapors.

What I claim as my invention, and desire to secure by Letters Patent, is—

1. The process of purifying hydrochloric-acid gases, which consists in washing the gases with a mineral oil substantially as and for the purpose described.

2. The process of purifying hydrochloric-acid gases, which consists in washing the gases with a finely-divided mineral oil, substantially as and for the purpose described.

3. The process of purifying hydrochloric-acid gases, which consists in passing the gases through a filter of porous bodies and then washing the gases with a mineral oil, substantially as and for the purpose described.

4. The process of purifying hydrochloric-acid gases, which consists in passing the gases through a filter of porous bodies and then washing the gases with a finely-divided mineral oil, substantially as and for the purpose described.

5. The process of purifying hydrochloric-acid gases, which consists in first washing the gases with a mineral oil and then washing the oil with water substantially as and for the purpose described.

6. The process of purifying hydrochloric-acid gases, which consists in first washing the gases with a finely-divided mineral oil and then washing the oil with water, substantially as and for the purpose described.

7. The process of purifying hydrochloric-acid gases, which consists in first washing the gases with a mineral oil, then washing the oil with water containing caustic lime, and finally adding hydrochloric acid to the water, substantially as and for the purpose described.

8. The process of purifying hydrochloric-acid gases, which consists in first washing the gases with a finely-divided mineral oil, then washing the oil with water containing caustic lime, and finally adding hydrochloric acid to the water, substantially as and for the purpose described.

9. The process of purifying hydrochloric-acid gases, which consists in first passing the gases through a filter of porous material, then washing the gases with a mineral oil, and finally washing the oil with water substantially as and for the purpose described.

10. The process of purifying hydrochloric-acid gases, which consists in first passing the gases through a filter of porous material, then washing the gases with a finely-divided mineral oil, and finally washing the oil with water substantially as and for the purpose described.

11. The process of purifying hydrochloric-acid gases, which consists in first passing the gases through a filter of porous material, then washing the gases with a mineral oil, then washing the oil with water containing caustic lime, and finally adding hydrochloric acid to the water, as and for the purpose described.

12. The process of purifying hydrochloric-acid gases, which consists in first passing the gases through a filter of porous material, then washing the gases with a finely-divided mineral oil, then washing the oil with water containing caustic lime and finally adding hydrochloric acid to the water, as and for the purpose described.

In testimony whereof I have signed my name to this specification in the presence of two subscribing witnesses.

WILHELM HASENBACH.

Witnesses:
MAX HARTER,
JOS. H. LEUTE.